United States Patent [19]

Forsgren

[11] 4,044,525
[45] Aug. 30, 1977

[54] METHOD AND MACHINE FOR PACKING WOOD CHIPS

[75] Inventor: Ernst Erik Forsgren, Hudiksvall, Sweden

[73] Assignee: Anders Eric Sundin, Sweden; a part interest

[21] Appl. No.: 694,191

[22] Filed: June 8, 1976

Related U.S. Application Data

[63] Continuation of Ser. No. 568,815, April 17, 1975, abandoned.

[51] Int. Cl.² .............................................. B65B 1/20
[52] U.S. Cl. ..................................... 53/24; 53/124 B; 141/67; 241/101.7
[58] Field of Search ............... 53/21 R, 24, 35, 124 E, 53/124 B; 141/67; 241/101.7

[56] References Cited

U.S. PATENT DOCUMENTS

| 3,752,409 | 8/1973 | Lewis | 241/101.7 X |
| 3,760,556 | 9/1973 | Morris | 53/124 E X |
| 3,763,621 | 10/1973 | Klein | 53/24 |
| 3,790,986 | 2/1974 | Burger | 241/101.7 X |
| 3,861,603 | 1/1975 | Lautzenheiser et al. | 241/101.7 X |

Primary Examiner—Travis S. McGehee
Attorney, Agent, or Firm—Robert E. Burns; Emmanuel J. Lobato; Bruce L. Adams

[57] ABSTRACT

A method and a machine for packing wood chips into containers that are easily transported from the place of production to the place of utilization. The wood chips are blown from the discharge tube of the wood chipper straight into a tube-like package which has perforated walls allowing the air carrying the wood chips to escape from the package while the chips are retained inside the package.

6 Claims, 2 Drawing Figures

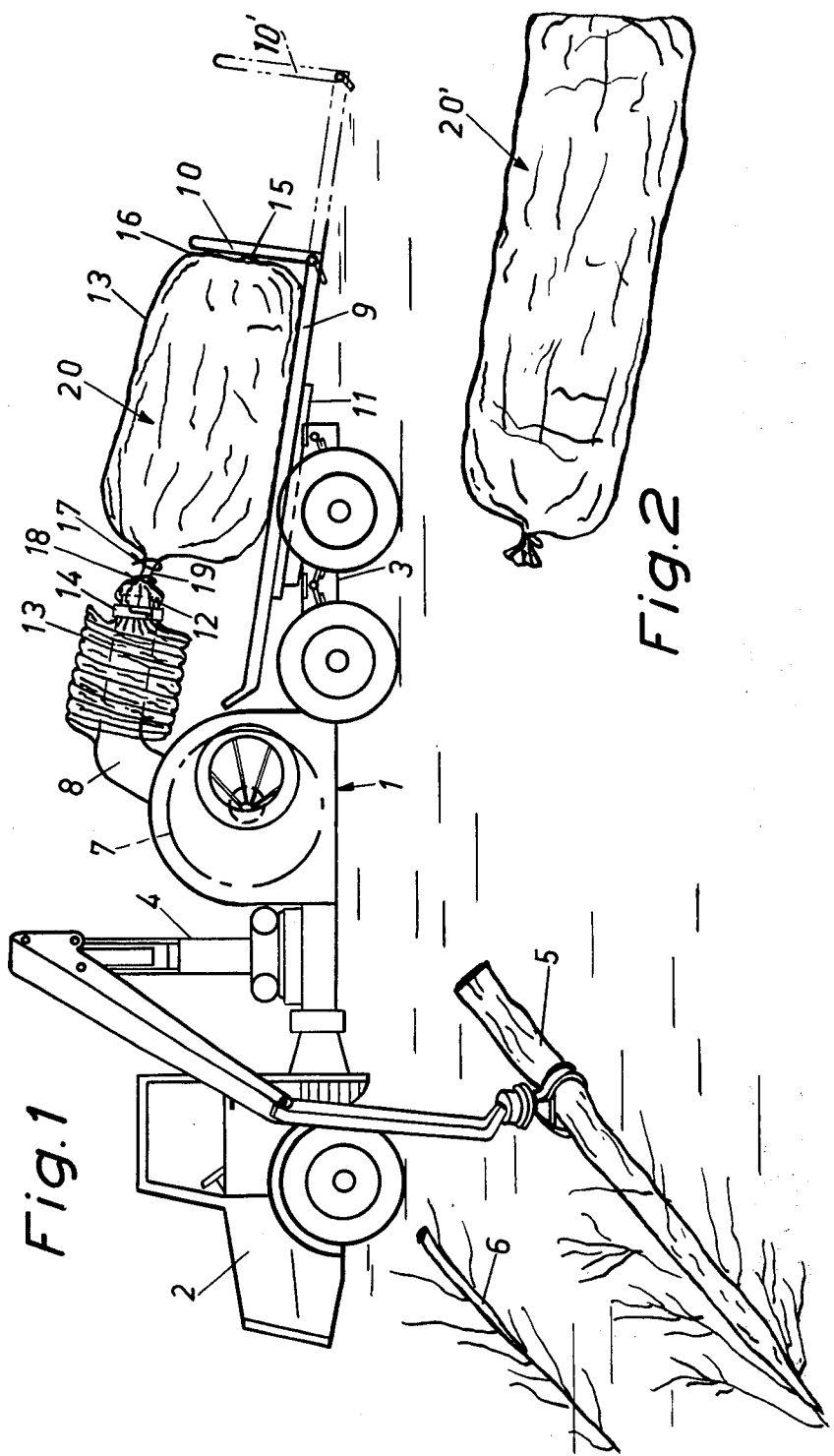

METHOD AND MACHINE FOR PACKING WOOD CHIPS

This is a continuation, of application Ser. No. 568,815, filed Apr. 17, 1975, now abandoned.

BACKGROUND OF THE INVENTION

In cutting-up raw materials, such as pulpwood, sawing waste, tree tops, weak trunks, branches and the like into wood chips - when the cutting-up takes place by means of mobile wood chippers - the chips are blown (sprayed) into a wood chip container for further transport to the intended industrial plants, e.g. pulp mills. Such chipping of raw materials generally takes place in connection with forestry thinning operations, in timber yards and small sawing mills.

One has found, however, that such wood chip handling is of limited use and not widely applicable on accoount of the following drawbacks:
 a. High costs of purchase and maintenance of wood chip containers.
 b. In the winter, the wood chips freeze into icy blocks, which makes emptying of the containes difficult.
 c. During the sapping period, wood chips originating from wood rich in sap, stick to one another, resulting in similar problems of container emptying as in the winter time.
 d. On account of their considerable dimensions and heavy weight, the containers require complicated loading and unloading equipment.
 e. Costs of return freight of empty containers.
 f. Because the handling system differs considerably from the ordinary techniques of distribution used with other wood raw materials, pulpwood, lumber, and so on, entirely novel conveying equipment and organization therefor are needed.

SUMMARY OF THE INVENTION

The present invention has for its purpose to remedy the above-mentioned drawbacks and concerns a novel method of packing wood chips so as to faciliate the transport thereof from the place of production to the point of utilization. It is characteristic of the invention that the wood chips are blown as a stream immediately upon the making thereof from the discharge tube of a cutting apparatus (wood chipper) into a perforated or air permeable tube-like package one end of which is closed. The package, is threaded over the discharge tube being supplied (with chips) therefrom and the air carrying or transporting the chips is allowed to escape through the perforations or mesh while the wood chips are retained inside the package. The invention thus concerns a new type of package intended for wood chips, the use of the package as well as the changed conditions of transport resulting therefrom. The invention makes it possible to enclose the wood chips immediately upon their leaving the discharge tube of the wood chipper apparatus in a package which is of a kind making it possible to make use of the transport methods commonly used in the timber and pulpwood industires.

The invention likewise concerns a machine designed for the performance of the method. The machine incorporates in the known manner a vehicle-mounted wood chipping apparatus having a fan for blowing the wood chips as a stream along a discharge flow path from the apparatus out through the discharge tube of the latter. In accordance with the invention the discharge pipe is arranged to receive an elongated tube-shaped perforated and foldable package which may be threaded onto the pipe and is progressively fed along the flow path. This package defines a terminal length of the flow path of the wood chips. The vehicle is preferably also provided with a stop abutment means variably postionable along the flow path to limit the lengthof the package upon filling of the latter with wood chips.

BRIEF DESCRIPTION OF THE DRAWING

The invention will be further elucidated in the following with reference to the accompanying drawing, wherein
FIG. 1 is a side view of a mobile wood chipping apparatus incorporating a device in accordance with the invention to produce a package containing wood chips, and
FIG. 2 is a side view of such a package when completely filled with wood chips.

DETAILED DESCRIPTION OF A PREFERRED EMBODIMENT

As appears from FIG. 1, the wood chipping apparatus or chipper 1 is supported on a vehicle 3 drawn by a tractor 2. On the vehicle is mounted a crane 4 to feed the wood chipper 1 with the raw material, such as tree tops 5, 6, to be cut up in the chipper. The latter is provided with a conveying fan 7 to the discharge opening of which is connected a discharge pipe 8. The vehicle 3 also is provided with a loading platform 9 or the like, preferably having a rear flap 10 which may be folded upwards. By means of an adjusting device 11 the distance of the flap 10 from the outlet end 12 of the pipe 8 may be varied.

Over the discharge pipe 8 may be threaded a tube-like net 13, preferably made from a textile material having a mesh size which is less the cross dimensions of the wood chips produced in the chipper 1 but which allows the conveying air from the fan 7 to be vented or escape through the meshes. The nut tube passes through a sleeve 14 mounted on the outlet end 12 of the discharge pipe 8.

Before the wood chipping apparatus 1 is started, the net tube 13 is closed in that its outer end is tied with a rope 15 or the like. The wood chips are blown from the chipper 1 through the pipe 8 into the net tube which, as the tube is filled, is pulled away from the pipe 8 through the sleeve 14 which through friction exerts some braking effect on the tube material. When the filling of the net tube 13 has progressed sufficiently far for the foremost tube end 16 to abut against the flap 10 serving as a stopper, two ropes 17, 18 are tied about the tube immediately outside the tube end 12 whereupon the tube portion 19 intermediate these two ties is cut. The finished package 20 is then rolled from the loading platform 9 down onto ground or, e.g. by means of the crane 4 or some other loading equipment loaded unto a lorry to be later dispatched to industrial plants or storage premises. FIG. 2 illustrates a completed package 20' having a length which corresponds to the position of the flap 10' illustrated in dash-and-dot lines in FIG. 1.

After severing of the tube portion 19 the machine is ready to fill another package.

Suitable dimensions for the net tube may be a length of appro. 50 meters and a diameter of appr. one metre. When textile materials are used for the net tube, the entire package, i.e. the wooden chips and their enclosure, may be used and put into e.g. a pulp digester. However, instead of textile materials other substances may be used, such as perforated plastics hoses. In such cases it is, however, necessary that the wood chips, if they are to be used for cellulose products, be removed from the tube which may then either be destroyed or re-used at the chip production place.

It is evident that package units of the kind appearing from FIG. 2 may be loaded onto the kind of transport vehicles commonly used in forestry by means of ordinary gripper devices, such as those used for loading and unloading of timber and pulpwood, and be further transported thereon to the place of utilization (cellulose industries, heating plants etc.).

The embodiment as shown and described is to be regarded as an example only and various modifications are possible within the scope of the appended claims. The friction sleeve 14 may be dispensed with or replaced by some other means which exerts a certain friction against the net tube when the latter is being filled with wood chips. The invention also embraces such platforms 9 serving as a support for the package unit 20 as have a stationary flap 10 serving as a stopper means.

What is claimed is:

1. An improved method for packaging wood chips comprising, making wood chips in a mechanical wood chipper by feeding waste wood including large branches of trees and tree tops to the mechanical wood chipper and simultaneously mechanically developing an air stream for immediately discharging the wood chips in a stream of air and principally as a stream of wood chips along a discharge path of flow, before discharging the wood chips along said dishcarge flow path defining a terminal length of said discharge flow path and the volume of chips that can flow along said discharge path of flow with an air-permeable, packaging tube of variable length disposed in an axially folded condition to receive the discharge stream of air and wood chips for storing thereof as a package, said tube having a closed end terminating flow of said wood chips internally of the tube, automatically filling the tube defining the terminal length of the discharge flow path with said stream of air and wood chips while progressively feeding said air-permeable tube along said flow path under control of wood chips impelled along said flow path by air thereby varying the length of the terminal length of the flow path in dependence upon the length of the package intended and while filling the tube simultaneously venting the air in said stream through said air-permeable tube at a rate to pack the wood chips as said tube fills with wood chips, before filling said tube positioning a stop for determining the terminal length of the tube by determining the position at which said closed end thereof will engage said stop, and removing the filled tube as a storable package.

2. An improved method for packaging wood chips according to claim 1, including variable determining the length of the filled tube by variable controlling the terminal position of said closed end thereof.

3. An improved method for packaging wood chips according to claim 1, in which said air-permeable tube compreses perforations and a mesh holding the wood chips therein and allowing the air to escape through the perforations at said rate.

4. In combination, an apparatus for making wood chips and packaging them comprising, a mechanical wood chipper having means for making wood chips from waste wood including large tree branches and tops of trees and means for simultaneously developing an air stream and immediately propelling them as a stream of wood chips along a discharge flow path, a crane for loading large tree branches and tops of trees to said wood chipper, and an air-permeble tube folded axially for defining a terminal length of the discharge flow path for receiving the stream of wood chips and having a closed end terminating their flow internally of the tube and having perforated walls for simultaneously venting the air in said stream for filling said tube with packed wood chips to a desired extent as a package, means for directing and feeding the stream of wood chips into the perforated tube for automatic filling and packing thereof and for progressively feeding said perforated tube from a folded condition along said discharge flow path under control of the stream of wood chips, stop means variable in position along said flow path and against which said closed end of the tube bears as said tube is progressively filled, thereby said package is controllable as to length.

5. The combintion for making wood chips and packaging them according to claim 4, in which said means for making wood chips and means for developing an air stream propelling said wood chips into said tube simultaneously with the making thereof each comprise mechanical means, and said tube having a mesh allowing air to escape through the mesh thereof and retaining the wood chips therein.

6. In combination, a vehicle and an apparatus transportably mounted on said vehicle for making wood chips an packaging them in various size packages for delivery and storage; said apparatus comprising, a driven mechanical wood chipper for making into wood chips waste wood including large tree branches, tree trunks and the tops of trees, mechanical means in said wood chipper for simultaneously developing an air stream and immediately impelling them by said air stream as a stream of wood chips along a discharge flow path, a crane on said vehicle for supplying said mechanical wood chipper with large tree branches, tree trunks and the tops of trees for making them into wood chips, an air-permeable tube having perforated walls folded axially for defining a terminal length of the discharge flow path for receiving the stream of wood chips automtically delivered thereto and having a closed end terminating their flow internally of the tube, means for directing and feeding the stream of wood chips into the perforated tube for automatic filling and packing thereof and for progressively feeding the perforated tube from a folded condition under control of the stream of wood chips, said perforated walls comprising a mesh effective for simultaneously venting the air in said stream during filling of said perforated tube an effective for allowing packing of the wood chips to a desired extent as a package under control of the stream of wood chips, and stop mean for variable positioning along said flow path and against which said closed end of said tube bears as said tube is progressively filled, thereby said package is controllable as to length.

* * * * *